United States Patent [19]
Stroh et al.

[11] Patent Number: 5,975,547
[45] Date of Patent: Nov. 2, 1999

[54] STEERING KNUCKLE ASSEMBLY WITH LUBRICATION SYSTEM

[75] Inventors: Clinton Byron Stroh, Portage; Jay Dudley White, Galesburg, both of Mich.

[73] Assignee: Sanford Acquisition Company, Bingham Farms, Mich.

[21] Appl. No.: 08/926,199

[22] Filed: Sep. 9, 1997

[51] Int. Cl.⁶ .................................................. B62D 7/18
[52] U.S. Cl. ...................................................... 280/93.512
[58] Field of Search ........................... 280/93.512, 93.511

[56] References Cited

U.S. PATENT DOCUMENTS

| | | | |
|---|---|---|---|
| 3,294,413 | 12/1966 | Jurosek et al. | 280/93.512 |
| 3,300,230 | 1/1967 | Spencer | 280/93.512 |
| 3,479,051 | 11/1969 | Weiss | 280/93.512 |
| 3,542,392 | 11/1970 | Cumming | 280/93.512 |
| 3,563,564 | 2/1971 | Bartkowiak | 280/93.512 |
| 3,659,869 | 5/1972 | Hase et al. | 280/93.512 |
| 4,043,567 | 8/1977 | Kaiser | 280/93.512 |

*Primary Examiner*—Kenneth R. Rice
*Attorney, Agent, or Firm*—Liniak, Berenato, Longacre & White

[57] ABSTRACT

A steering knuckle assembly receives a distal end of a steer axle beam which is generally symmetrical about a center line and has a pin bore therethrough. This knuckle assembly includes a steering knuckle which pivotally cooperates with the axle beam distal end. The steering knuckle includes a pair of yokes where each has a yoke bore longitudinally therethrough coaxially aligned with each other and with the pin bore. Each yoke also includes a yoke outer surface, and a yoke face surface which cooperates with a corresponding axle beam distal end and has an aperture formed therein. The knuckle assembly also includes a kingpin which has opposed ends and is received by the pin and yoke bores. Also included is a pair of yoke seals, each received by the yoke face aperture which includes an annular housing and an annular rubber portion. The rubber portion has at least one lip which operatively contacts the kingpin to provide a seal therewith. Further included is a pair of flexible bladder seals, whereby with each adjacent kingpin end defines a grease receptacle to retain grease and to provide lubrication between the kingpin and the steering knuckle during articulation.

17 Claims, 2 Drawing Sheets

Fig. 2
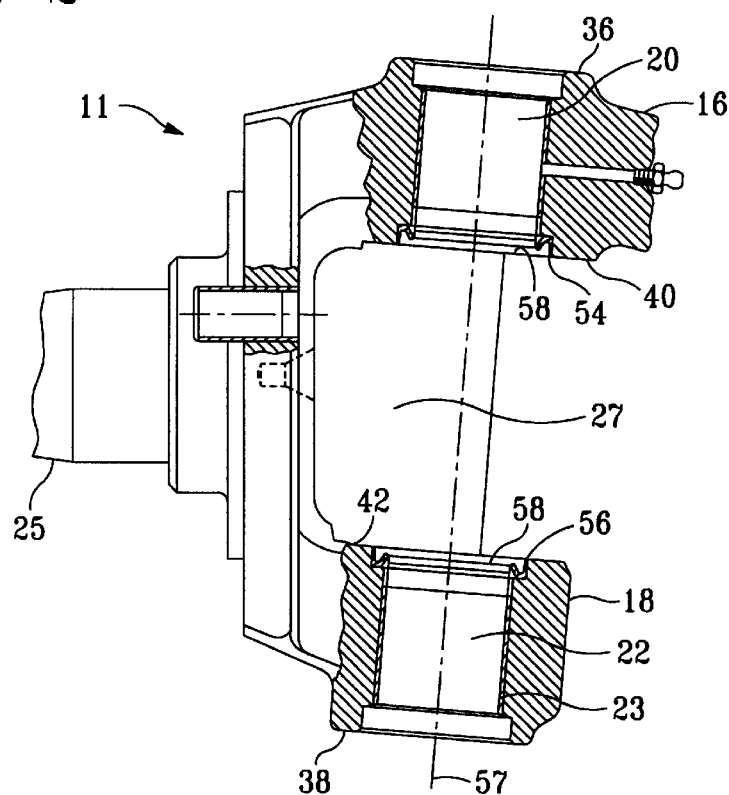
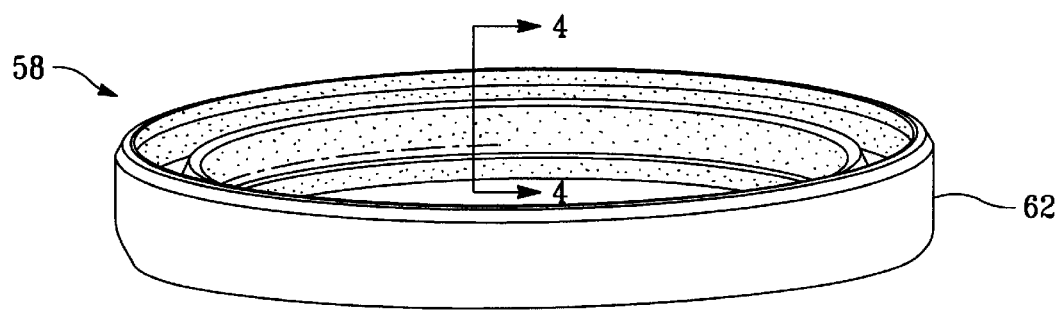
Fig. 3
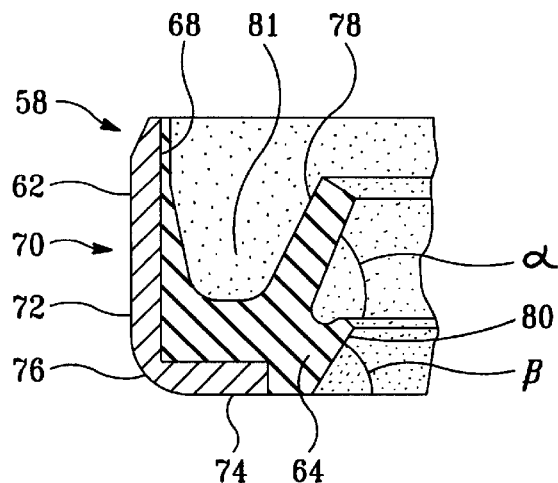
Fig. 4

STEERING KNUCKLE ASSEMBLY WITH LUBRICATION SYSTEM

TECHNICAL FIELD

The invention relates to a steering knuckle assembly having an improved lubrication system.

BACKGROUND ART

The steering knuckle assembly (wheel spindle assembly) of a motor vehicle includes a steering knuckle having a kingpin joint which receives an end of the steer axle. A kingpin (spindle bolt) is then inserted through bores in the kingpin joint and a bore coaxially aligned in the steer axle end, thereby pivotally securing the axle to the steering knuckle. The kingpin is a pivot axis around which the steering knuckle may move with respect to the axle. Such a design is common in motor trucks of the light to heavy-duty class.

In order for the steering knuckle to pivot and rotate, lubrication is provided in the knuckle joint bores. However, possible contamination may enter the joint, among other places, where the axle beam cooperates with the knuckle. While seals are presently used, they are not able to effectively keep contamination, water, and other foreign matter out of the bearing joint, while ensuring that the joint remains properly lubricated. This often leads to relubrication of the joints at frequent intervals, resulting in greater costs and increased labor associated with maintaining the steering assembly. Also, the potential contamination of the knuckle joint may reduce the life of the kingpin, associated bearing surfaces and other kingpin joint components, which may further lead to premature wear and possible replacement of the kingpin joints.

Moreover, the associated steer axle beam deflects under load, producing a pressure differential in the kingpin joint bearing areas. This pressure differential tends to pull contamination into the kingpin joint and bearings, thus reducing the life of the bearings and other kingpin joint components and again, resulting in frequent relubrication or potential replacement of parts due to wear and insufficient lubrication.

Various references have attempted to provide lubrication to a steering knuckle. For example, U.S. Pat. No. 4,043,567 issued to Kaiser discloses a steering axle assembly having a system for ensuring that lubricant has passed completely to the outer ends of the kingpin. An end plate having a check valve is provided in this reference, whereby the check valve allows grease to pass outwardly when there is sufficient lubrication in the kingpin receiving bores. This reference further discloses a disc-type plug which is flattened into position on the lower end of the lower yoke to prevent the flow of lubricant therefrom. However, this design does not prevent contamination from being drawn into the knuckle.

Further, U.S. Pat. No. 3,659,869 issued to Hase et al. discloses an axle spindle bearing assembly which includes a lower and upper bearing connected to each other by a bore system provided in the axle spindle bolt. A reservoir space connected to the bore system is arranged in the axle spindle bolt within the area of the upper bearing which is in communication with the section of the bore system leading to the lower bearing, for example, by way of a return checking device. However, this arrangement is costly in terms of tooling, manufacturing and piece price.

Consequently, the need has developed for an improved kingpin joint of a steering knuckle assembly which provides additional protection against the introduction of contamination and other foreign matter and allows for better long-term grease retention and lubrication of the joint. The kingpin joint should also be provided with a dedicated seal for when the steer axle and associated components deflect under service loads.

SUMMARY OF THE INVENTION

Accordingly, it is the principle object of the present invention to provide an improved lubrication system adapted for use with a kingpin joint which provides protection against contamination entering the bearing area.

It is yet another object of the present invention to provide a seal and bladder assembly for a kingpin joint which allows lubricating grease to be purged in one direction.

It is still another object of the present invention to provide a seal and bladder assembly for a kingpin joint which allows for a stronger seal when the steer axle deflects under service loads.

In carrying out the above objects, features and advantages of the present invention, provided is a steering knuckle assembly for a motor vehicle. The steering knuckle assembly receives a distal end of a steer axle beam, the beam being generally symmetrical about a centerline. The distal end of the axle beam has a pin bore formed therethrough. The steering knuckle assembly includes a steering knuckle for pivotally cooperating with the distal end of the steer axle beam. The steering knuckle includes a pair of yokes, with each having a yoke bore longitudinally formed therethrough which is coaxially aligned the other yoke bore and with the pin bore of the axle beam distal end. Each of the pair of yokes further includes a yoke face surface for cooperating with the corresponding distal end of the steer axle beam and having an aperture formed therein. Each yoke also has a yoke outer surface.

The steering knuckle assembly also includes a kingpin which is received by the pin bore of the axle beam distal end and having opposed ends each received by a corresponding yoke bore. The kingpin pivotally connects the steering knuckle to the axle beam distal end. Also included in the steering knuckle assembly is a pair of yoke seals, each received by the aperture of a corresponding yoke face surface and including an annular housing and an annular rubber portion. The annular housing has an exterior surface which engages the aperture and an interior surface to which the rubber portion mounts. The rubber portion has at least one lip which operatively contacts the kingpin with which it creates and provides a seal.

The steering knuckle assembly also includes a pair of flexible bladder seals, whereby along with an adjacent kingpin end each bladder seal defines a grease receptacle therebetween which retains grease therein to provide and pump lubrication through the yoke bores, between the kingpin and the steering knuckle during articulation of the steering knuckle. Each yoke face surface is generally in a plane perpendicular to the yoke bore or kingpin, and the aperture of the yoke face surface is coaxial with the yoke bore.

In a preferred embodiment, the annular housing of the yoke seal has an L-shaped cross section which includes a relatively long side wall, a relatively short bottom wall, and a curved portion as a transition between the side wall and bottom wall. In this embodiment, the annular housing is operatively received by the aperture of the knuckle so that the long side wall is substantially parallel to the bore axis.

In another preferred embodiment, the steering knuckle assembly includes a pair of end caps, each of which cooperates with a corresponding yoke outer surface. Each cap has an opening therethrough for venting to atmosphere. Still in another preferred embodiment, the rubber portion of the yoke seal has a pair of lips each angled in a direction toward the yoke face surface.

In yet another embodiment according to the objects and goals of the present invention, provided is a lubrication system for a steering knuckle kingpin joint assembly which has an upper yoke, a lower yoke, and a kingpin, and a pair of end caps having an opening therethrough, with each yoke having a bore longitudinally therethrough and coaxially aligned with each other for receiving the kingpin, each yoke further having a yoke face surface for cooperating with a corresponding axle face surface on a steer axle end, and a yoke outer surface for cooperating with a respective end cap, each of the yoke face surfaces having an annular pocket formed therein which is coaxial with a corresponding bore. The sealing system includes a pair of yoke seals received within each of the annular pockets in a corresponding yoke face surface. Each yoke seal includes an annular housing and an annular rubber portion. The annular housing has an exterior surface which engages the annular pocket and an interior surface to which the rubber portion attaches. The rubber portion has at least one lip which operatively contacts the kingpin to provide a seal with the kingpin.

The sealing system also includes a pair of bladder seals disposed between each kingpin end and a corresponding end cap to retain grease and provide lubrication to the kingpin joint when the steering knuckle is under load. Again, in a preferred embodiment of the sealing system, a pair of lips is provided on the rubber portion of the yoke seal and are angled in a direction toward the yoke face surface. The annular housing for the sealing system also has an L-shaped cross-section which has a relatively long side wall, a relatively short bottom wall, and a curved portion between the bottom and side walls. The annular housing is operatively received by the pocket so that the side wall is substantially parallel to the bore axis.

Lastly, in another embodiment provided is a front steering assembly for use in a motor vehicle, where the front steering assembly includes a steer axle beam which is generally symmetrical about a centerline and also has a pair of opposed distal ends in which each distal end has a pin bore formed therethrough. The steering assembly also includes a pair of steering knuckle assemblies, where each steering knuckle assembly pivotally cooperates with a corresponding axle beam distal end and includes a knuckle having an upper yoke and lower yoke. Each of the upper yoke and lower yoke has an upper bore and lower bore, respectively, longitudinally formed therethrough. Each bore is coaxially aligned with the other and with the pin bore of the corresponding axle beam distal end. Each of the upper yoke and lower yoke further includes a yoke outer surface, a yoke face surface which cooperates with the corresponding axle beam distal end. The yoke face surface has a pocket formed therein which is coaxial with the corresponding one of the upper and lower bore.

Also included in the steering assembly is a pair of kingpins where each kingpin has opposed ends and is received by the corresponding pin bore of the axle beam distal end and both the upper bore and lower bore. The kingpin fastens each steering knuckle assembly to a corresponding axle beam distal end. The steering assembly further includes a pair of end caps where each pair corresponds to an adjacent one of the pair of steering knuckle assemblies and each end cap cooperates with a corresponding yoke outer surface. Each end cap also has an opening therethrough for venting to atmosphere. The steering assembly also includes a pair of yoke seals where each pair corresponds to an adjacent one of the pair of steering knuckle assemblies.

Each pair of yoke seals is received by the pocket of a corresponding yoke face surface and includes an annular housing and an annular rubber portion. The annular housing has an exterior surface which engages the pocket and an interior surface which attaches to the rubber portion. The rubber portion has at least one lip in order to operatively contacting the kingpin and to provide a seal therewith. Moreover, included in the steering assembly is a pair of bladder seals, each pair of which corresponds to an adjacent one of the pairs of steering knuckle assemblies. Each pair of bladder seals is disposed between an adjacent end cap and kingpin end in order to provide lubrication between the kingpin and knuckle when the knuckle is under load.

In a preferred embodiment, the steering assembly has first lip and second lip are each angled in a direction toward the yoke face surface. In another preferred embodiment, also included is a pair of end caps which corresponds to an adjacent one of the pair of steering knuckle assemblies. Each end cap cooperates with a corresponding yoke outer surface and has an opening therethrough for venting to atmosphere. In still another preferred embodiment, the steering assembly has the aforementioned the bladder seal and adjacent kingpin end, which together define a grease receptacle for retaining grease therein and for providing lubrication between the kingpin and knuckle when the knuckle is under load.

And yet in another preferred embodiment, the annular housing of each yoke seal has an L-shaped cross section which has a relatively long side wall, a relatively short bottom wall, and a curved portion therebetween. The annular housing is operatively received by the pocket so that the side wall is substantially parallel to the bore axis.

The above objects and other objects, features, and advantages of the present invention are readily apparent from the following detailed description of the best modes for carrying out the invention when taken in connection with the accompanying drawings.

BRIEF DESCRIPTION OF THE DRAWINGS

FIG. 2 is a partial side-sectional view of a kingpin joint portion of a steering knuckle having a pair of yoke seals according to the present invention installed therein;

FIG. 3 is a perspective view of the yoke seal according to the present invention; and FIG. 4 is a sectional view of the steering knuckle according to the present invention, taken along line 4—4 of FIG. 3.

BEST MODES FOR CARRYING OUT THE INVENTION

Figure 1:
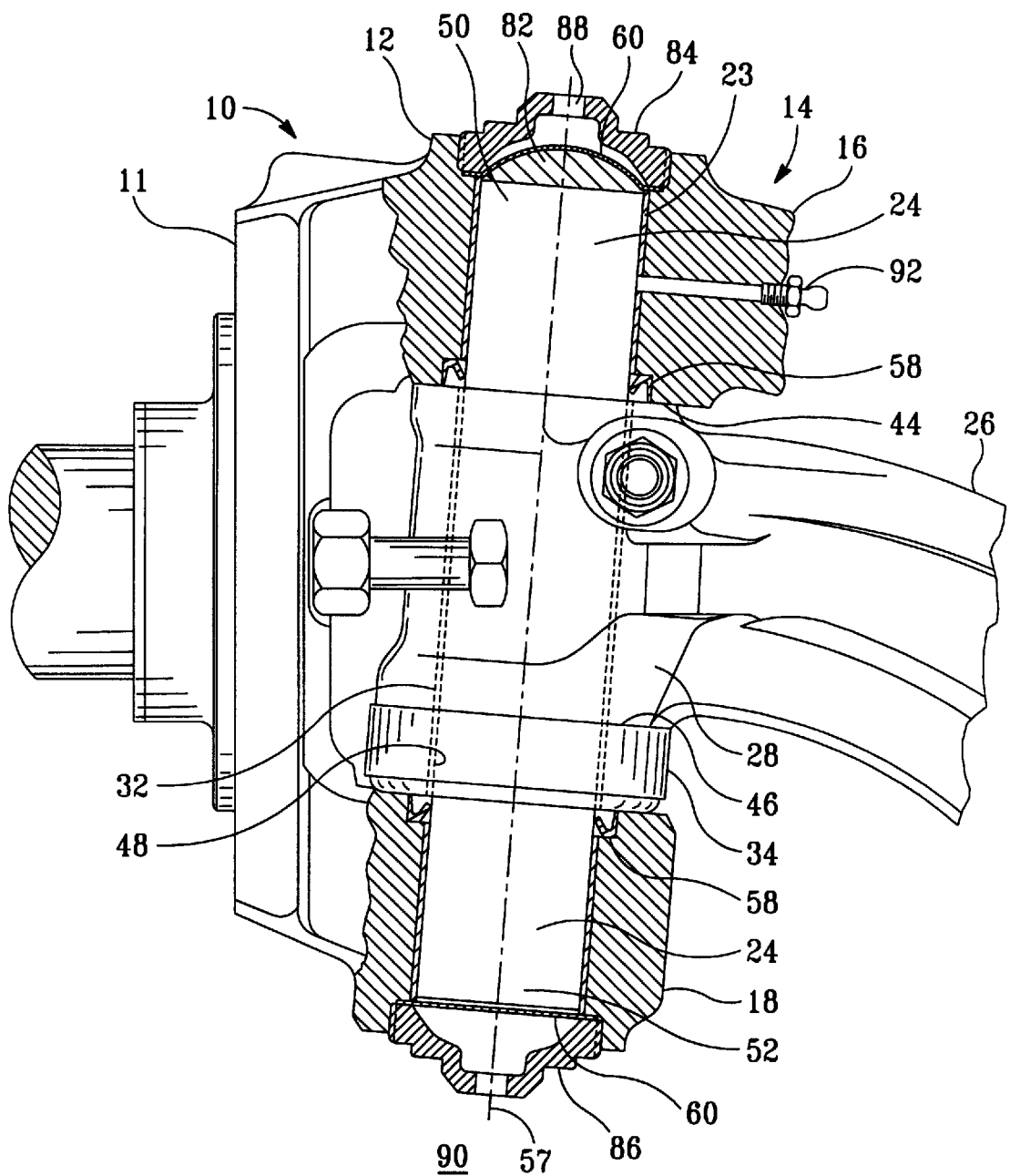
FIG. 1 is a partial front-sectional view of a steering assembly according to the present invention, which includes the steer axle, kingpin joint with a pair of yoke seals, and a pair of grease bladders.

With reference to FIG. 1 of the drawings, shown therein is a partial front-sectional view of a typical steering assembly 10 for a motor vehicle. Steering assembly 10 generally includes, among other components, a steering knuckle assembly 11 (also known in the art as a wheel-spindle or knuckle-spindle assembly). Knuckle assembly 11 includes a steering knuckle 12 having a bifurcated kingpin joint 14 with a pair of yokes. These yokes are referred to as an upper yoke section 16 and a lower yoke section 18. As is best shown in FIG. 2, each of the upper yoke section 16 and the lower yoke section 18 has a cylindrical upper yoke bore 20 and a cylindrical lower yoke bore 22, respectively, formed therethrough, each bore 20 and 22 being co-axially in alignment with each other. Referring again to FIG. 1 and as best shown therein, bores 20 and 22 are sized to receive and rotatably accommodate a cylindrical kingpin 24 (also known in the art as a spindle bolt). Accordingly, a bushing 23 is typically provided in each yoke bore 20 and 22 of each upper and lower yoke 16 and 18 to act as a bearing surface in the region between inner diameter of each yoke bore (20 and 22) and kingpin 24.

Steering knuckle assembly 11 also includes a spindle 25 (partially shown), upon which a front wheel (not shown) is mounted. Each front wheel is therefore supported on spindle 25 to permit the front wheels to swing to one side or the other, via kingpin 24, with respect to a pivotally mounted steer axle beam 26, discussed further herein.

A steering knuckle assembly 11 is provided on the right and left sides of the vehicles, symmetrically about a steer axle centerline as is known in the art, in order to receive steer axle beam 26. More particularly the yoke gap area 27 (best shown in FIG. 2) separating upper and lower yokes 16 and 18 receives a distal end 28 of steer axle beam 26. Axle beam 26 is generally symmetrical about a centerline. Each distal end 28 of steer axle beam 26 has a cylindrical pin bore 32 (shown in phantom in FIG. 1) formed longitudinally therethrough for receiving and containing a central portion 48 of kingpin (shown in phantom in FIG. 1).

As discussed above, each distal end 28 is received by steering knuckle 12 between the bifurcated yoke (area 27) and particularly between upper yoke 16 and lower yoke 18. Steering knuckle 12 pivotally cooperates with distal end 28 of steer axle beam 26. Typically, upper yoke 16 cooperates with distal end 28 via shims if necessary, while lower yoke 18 and distal end 28 indirectly cooperate with each other via at least one thrust bearing 34 disposed therebetween, as illustrated in FIG. 1.

Each yoke bore 20 and 22 is further coaxially aligned with a pin bore of distal end 28, as shown coaxially aligned in FIGS. 1 and 2 by bore axis 57. Thus, distal end 28 is sandwiched or disposed between the upper and lower yokes 16 and 18, so that upper bore 20, lower bore 22, and pin bore 32 are aligned and co-linear and form a complete passageway. It is through this complete passageway that kingpin 24 is inserted and retained in order to attach steering knuckle assembly 11 to steer axle beam 26.

With regard to each of the upper and lower yoke sections 16 and 18, each yoke section further includes a yoke outer surface, 36 and 38, respectively, and a yoke face surface 40 and 42, respectively. As shown in FIGS. 1–2, yoke outer surface 36 and 38 are situated on the outside of steering knuckle 12, while yoke face surfaces 40 and 42 (or inner surfaces) are situated adjacent yoke gap area 27, proximate steer axle beam distal end 28.

It is illustrated in FIG. 1 and 2 that yoke face surface 40 is in direct cooperation with axle face surface 44, and provides a bearing surface therefor. However, it is contemplated that spacers or shims may be provided therebetween if necessary to control end play in this area. On the other hand, lower yoke face surface 42 typically cooperates with lower axle face surface 46 of distal end 28 of axle beam 26 indirectly through a thrust bearing 34. As seen in FIG. 2, each yoke face surface 40 and 42 has a aperture bore (or pocket) , 54 and 56 respectively, machined therein. Each yoke face surface 40 and 42 is also perpendicular to an axis 57 of its adjacent yoke bore 20 and 22 (and also kingpin 24).

Kingpin 24 has a longitudinal center section 48 (around which axle beam 26 is disposed) and opposed ends 50 and 52. When assembled as shown in FIG. 1, center section 48 of kingpin 24 is disposed in the pin bore 32 of axle beam distal end 28, while each opposed end 50 and 52 of kingpin 24 is received by a corresponding yoke bore 20 and 22, respectively. Again, kingpin 24 pivotally fastens steering knuckle 12 to distal end 28 of steer axle beam 26.

The lubrication system (or sealing system) according to the present invention includes a pair of yoke seals 58 (best shown in FIGS. 2–4), and a pair of bladder seals 60 (best shown in FIG. 1). Each of the pair of yoke seals 58 are received in a press fit by a corresponding aperture bore 54 and 56 of a yoke face surface 40 and 42, respectively. Each aperture bore 54 and 56 of yoke face surface 40 and 42 is aligned and is preferably coaxial with its corresponding yoke bore 20 and 22.

With particular reference to FIGS. 3–4, each yoke seal 58 includes a housing 62 which is preferably annular in shape to fit its corresponding aperture bore 54 and 56. Housing 62 is formed of a metal and preferably a brass material (ASTM B-19 or B-56) or steel SAE 1008–1010. Each yoke seal also includes a rubber portion 64 which is also preferably annular in order to mate with annular housing 62. Rubber portion is preferably formed of a rubber such as buna N 80 durometer or nitrile SAEJ200. Of course, these materials are suggested by way of example and not limitation. Housing 62 has an exterior surface 66 which engages aperture bore 54 and 56. Housing 62 also has an interior surface 68 to which rubber portion 64 is molded or otherwise mounted.

More particularly, as shown in FIG. 4, annular housing 62 has an L-shaped cross-section 70 with a relatively long side wall 72, a relatively short bottom wall 74, and a curved portion 76 therebetween as a transition between walls 72 and 74. Housing 62 is operatively received by each aperture bore 54 and 56 so that side wall 72 is substantially parallel its adjacent yoke bore axis 57.

Rubber portion 64 of yoke seal 58 has at least one lip 78 which serves to operatively contact kingpin 24 to provide a seal therewith. Lip 78 is angled in a direction toward its corresponding yoke face surface 40 and 42 and in a direction away from the pressurized joint region (i.e. away from its corresponding yoke outer surface 36 and 38). Thus, yoke seal 58 in the orientation shown in FIGS. 3–4 and without any further rotation or articulation, is properly oriented to fit into pocket 56 of lower yoke 18 of FIG. 2.

In this orientation, during a lubrication or relubrication procedure, pressurized grease is forced through each bore toward yoke seal 58 and grease is purged from lip 78 open in a direction to carry with it any contaminants that may be contained in the kingpin joint as well as ensuring that grease is distributed throughout the joint. In any other orientation of yoke seal 58, grease would not be able to purge past lips 78 and/or 80 during high-pressure lubrication.

In a preferred embodiment, as shown in FIGS. 3–4, a second lip 80 is provided to also operatively contact kingpin 24 for providing a seal therewith. Second lip 80 is smaller in size relative to lip 78 and is also angled in a direction toward its corresponding yoke face surface 40 and 42.

In a preferred embodiment, first lip 78 has an angle $\alpha$ of approximately 25°–40°, and second lip 80 has an angle $\beta$ of approximately 32°–45°. In one embodiment for a 14.6 to 20,000 pound steering knuckle where the kingpin has a shaft diameter of approximately 47.6 mm, yoke seal 58 may have an outer diameter of approximately 57.33 mm, pockets 54 and 56 have a diameter of 57.23 mm, and length (L) of long side wall 72 is approximately 6 mm, angle α is approximately between 30°–35°, angle β is approximately 39°, lip 1 has an outside width of approximately 1 mm and lip 2 has an outside width of approximately 0.5 mm. Again, these measurements are only illustrative, as the actual yoke seal may have various measurements depending, among other things, on the size of the kingpin, the size of the knuckle, the load the knuckle is expected to carry, the size of the knuckle bores and the quantity of lubrication needed.

As disclosed above, the sealing system in accordance with the present invention also includes a pair of flexible bladder seals 60 (or diaphragms). As shown in FIG. 1, bladder seal 60 is preferably a disk shaped piece of flat rubber. Each bladder seal 60, in conjunction with an adjacent opposed end 50 and 52 of kingpin 24, defines a grease receptacle 82 therebetween. As pressurized grease is pumped in to the kingpin joint to flow between kingpin 24 and bushing 23, the grease is pumped near each end of kingpin 50 and 52, thereby expanding each bladder 60. As shown in FIG. 1, bladder seal 60 which is associated with upper yoke 16 is shown having a dome shape due to the reservoir of grease stored therein. Thus bladder seal 60 acts as a grease accumulator, and as axle beam 26 deflects under load, more grease and not contamination, is pulled into the bearings and knuckle joint. The profile of the bladder seal may eventually become lower through time as the grease is pushed through the knuckle joint.

As discussed further herein, the side of each bladder opposite kingpin 24 is open to atmosphere, and so each bladder seal 60 acts as a grease accumulator as steer axle 26 deflects under load, so that more grease, and not contamination, is pulled into the bearings during operation of assembly 10. Grease receptacle 82 contains and retains grease or other lubricant therein for providing lubrication between kingpin 24 and steering knuckle 12 during articulation of steering knuckle 12. Each of the pair of bladder seals 60 is typically oriented between an adjacent one of the opposed ends 50 and 52 of kingpin 24.

Steering knuckle assembly 11 also includes a pair of end caps 84 and 86. As illustrated in FIG. 1, each end cap 84 and 86 cooperates with a corresponding yoke outer surface 36 and 38, respectively. Each end cap 84 and 86 also has an opening 88 included therethrough which allows for venting of pressurized air to atmosphere 90. Previously an end cap had a grease fitting or zerk by which the knuckle was lubricated or relubricated, and grease was thereby pumped into the knuckle bores. However, as described above, the end cap according to the present invention should have a breather passage 88, thus necessitating that grease be pumped into the joint in another fashion. One such method is via a grease fitting 92 (or zerk as known in the art) in the side of knuckle 12, as shown in FIGS. 1 and 2.

As stated above, under load, steering knuckle 12 deflects in a direction opposite axle beam 26 and kingpin 24 which are joined in an interference fit causing them to move in unison. This sliding force causes kingpin 24 to act like a piston, thereby causing upper yoke bore 20 to develop a vacuum therein which acts to suction and draw contamination into kingpin joint 14 at the area of yoke face surface 40. On the other hand, this piston-like movement simultaneously causes lower yoke 22 to become pressurized. Thus, a pressure differential is created between upper yoke 16 and lower yoke 18. The side of bladder seal 60 distal kingpin 24 is open to atmosphere so that bladder seal 60 may move freely (i.e. expand and deflate with the vacuum pressure forces). Specifically in the embodiment shown in FIG. 1, opening 88 of each end cap 84 and 86 is vented to atmosphere 90 thus allowing the bladder seal 60 to freely move as this pressure differential is created during axle beam 26 loading. of course, when steering knuckle 12 goes from a loaded to an unloaded condition, a pressure differential is still provided, however, in this state the pressure is provided in upper yoke 16 while the vacuum is provided in lower yoke 18.

Bladder seal 60 attempts to equalize this pressure differential by pulling air from atmosphere into joint. However, any contamination that may accompany the air is kept out by lips 78 (and 80 if applicable) of each yoke seal. This pressure however, is less than the pressure that occurs during the aforementioned lubrication and relubrication procedures, so that this piston-like movement does not cause grease to be purged from lips 78 and/or 80 or yoke seal 58. Thus, kingpin joint 14 and its related assemblies are able to retain grease and lubricant longer, resulting in less wear on knuckle assembly 11 components and thus less maintenance.

It is understood, of course, that while the forms of the invention herein shown and described include the best mode contemplated for carrying out the present invention, they are not intended to illustrate all possible forms thereof. It should also be understood that the words used are descriptive rather than limiting, and that various changes may be made without departing from the spirit or scope of the invention as claimed below.

What is claimed is:

1. A lubrication and sealing system for a steering knuckle kingpin joint assembly having an upper yoke, a lower yoke, a kingpin having opposed ends, and a pair of end caps each having an opening therethrough, each yoke having a bore longitudinally therethrough and coaxially aligned with each other for receiving the kingpin, each yoke further having a yoke face surface for cooperating with a corresponding axle face surface on a steer axle end and a yoke outer surface for cooperating with a respective end cap, each of the yoke face surfaces having an annular pocket formed therein coaxial with a corresponding bore, the sealing system comprising:

a pair of yoke seals received within each of the annular pockets in the yoke face surfaces, each yoke seal including an annular housing and an annular rubber portion, the annular housing having an exterior surface engaging the annular pocket and an interior surface to which the rubber portion is attached, the rubber portion having at least one lip for operatively contacting the kingpin to provide a seal therewith; and a pair of bladder seals disposed between each kingpin end and corresponding end cap for retaining grease and to provide lubrication to the kingpin joint when the steering knuckle is under load.

2. The lubrication and sealing system of claim 1, wherein the at least one lip of the rubber portion is a pair of lips angled in a direction toward the yoke face surface.

3. The lubrication and sealing system of claim 1, wherein the annular housing of each yoke seal has an L-shaped cross-section with a relatively long side wall, a relatively short bottom wall, and a curved portion therebetween, the annular housing operatively received by the pocket so that the side wall is substantially parallel to the bore axis.

4. A steering knuckle assembly for a motor vehicle, the steering knuckle assembly for receiving a distal end of a steer axle beam which is generally symmetrical about a center line, each distal end having a pin bore formed therethrough, the steering knuckle assembly comprising:

a steering knuckle for pivotally cooperating with the distal end of the steer axle beam, the steering knuckle including a pair of yokes, each of the pair of yokes having a yoke bore longitudinally formed therethrough coaxially aligned with each other and with the pin bore of the distal end of the steer axle beam, each of the pair of yokes further including a yoke outer surface, and a yoke face surface for cooperating with the corresponding distal end of the steer axle beam, the yoke face surface having an aperture formed therein; a kingpin having opposed ends and received by the pin bore of the axle beam distal end and each yoke bore, the kingpin for fastening the steering knuckle to the distal end of the steer axle beam;

a pair of yoke seals, each of the pair of yoke seals received by the aperture of a corresponding yoke face surface and including an annular housing and an annular rubber portion, the housing having an exterior surface engaging the pocket and an interior surface to which the rubber portion is mounted, the rubber portion having at least one lip for operatively contacting the kingpin to provide a seal therewith; and a pair of flexible bladder seals, each of the pair of bladder seals and an adjacent kingpin end defining a grease receptacle therebetween for retaining grease therein for providing lubrication between the kingpin and the steering knuckle during articulation of the steering knuckle.

5. The steering knuckle assembly of claim 4 wherein each yoke face surface is in a plane perpendicular to yoke bore axis and the aperture of the yoke face surface is coaxial with the yoke bore.

6. The steering knuckle assembly of claim 4 wherein the annular housing of each yoke seal has an L-shaped cross section with a relatively long side wall, a relatively short bottom wall, and a curved portion therebetween, the annular housing operatively received by the aperture so that the side wall is substantially parallel to the bore axis.

7. The steering knuckle assembly of claim 4 further comprising a pair of end caps, each end cap cooperating with a corresponding yoke outer surface and having an opening therethrough for venting to atmosphere.

8. The steering knuckle assembly of claim 4, wherein the at least one lip of the rubber portion is a pair of lips angled in a direction toward the yoke face surface.

9. A steering assembly for use in a motor vehicle, comprising:

a steer axle beam generally symmetrical about a center line and having a pair of opposed distal ends, each distal end having a pin bore formed therethrough;

a pair of steering knuckle assemblies, each steering knuckle assembly pivotally cooperating with a distal end of the steer axle beam and including a knuckle having an upper yoke and lower yoke, each yoke having an upper bore and lower bore, respectively, longitudinally formed therethrough which are coaxially aligned with each other and with the pin bore of the corresponding distal end of the steer axle beam, each of the upper yoke and lower yoke further including a yoke outer surface, a yoke face surface for cooperating with the corresponding distal end of the steer axle beam, the yoke face surface having a pocket formed therein coaxial with the corresponding one of the upper and lower bore;

a pair of kingpins, each kingpin having opposed ends and received by the corresponding pin bore of the axle beam distal end and the upper bore and lower bore, the kingpin for fastening each steering knuckle assembly to a corresponding distal end of the steer axle beam;

a pair of end caps corresponding to an adjacent one of the pair of steering knuckle assemblies, each end cap cooperating with a corresponding yoke outer surface and having an opening therethrough for venting to atmosphere;

a pair of yoke seals corresponding to an adjacent of the pair of steering knuckle assemblies, each of the pair of yoke seals received by the pocket of a corresponding yoke face surface and including an annular housing and an annular rubber portion, the housing having an exterior surface engaging the pocket and an interior surface to which the rubber portion is attached, the rubber portion having at least one lip for operatively contacting the kingpin to provide a seal therewith; and a pair of bladder seals corresponding to an adjacent one of the pairs of steering knuckle assemblies, each of the pair of bladder seals disposed between an adjacent end cap and kingpin end for providing lubrication between the kingpin and knuckle when the knuckle is under load.

10. The steering assembly of claim 9, wherein the first lip and second lip are each angled in a direction toward the yoke face surface.

11. The steering assembly of claim 9 wherein the bladder seal and adjacent kingpin end define a grease receptacle for retaining grease therein for providing lubrication between the kingpin and knuckle when the knuckle is under load.

12. The steering assembly of claim 9 wherein the annular housing of each yoke seal has an L-shaped cross section with a relatively long side wall, a relatively short bottom wall, and a curved portion therebetween, the annular housing operatively received by the pocket so that the side wall is substantially parallel to the bore axis.

13. A lubrication system for a steering knuckle kingpin joint assembly having an upper yoke, a lower yoke, a kingpin having opposed ends, and a pair of end caps each having an opening therethrough, each yoke having a bore longitudinally therethrough and coaxially aligned with each other for receiving the kingpin, a yoke outer surface for cooperating with a respective end cap, the lubrication system comprising:

a pair of bladder seals disposed between each kingpin end and corresponding end cap, each defining a reservoir for containing grease and for providing lubrication to the kingpin joint when the steering knuckle is under load.

14. A steering knuckle assembly for a motor vehicle, the steering knuckle assembly for receiving a distal end of a steer axle beam which is generally symmetrical about a center line, each distal end having a pin bore formed therethrough, the steering knuckle assembly comprising:

a steering knuckle for pivotally cooperating with the distal end of the steer axle beam, the steering knuckle including a pair of yokes, each of the pair of yokes having a yoke bore longitudinally formed therethrough coaxially aligned with each other and with the pin bore of the distal end of the steer axle beam, each of the pair of yokes further including a yoke outer surface, and a yoke face surface for cooperating with the corresponding distal end of the steer axle beam, a kingpin having opposed ends and received by the pin bore of the axle beam distal end and each yoke bore, the kingpin for fastening the steering knuckle to the distal end of the steer axle beam; and a pair of flexible bladder seals, each of the pair of bladder seals and an adjacent kingpin end defining a grease receptacle therebetween for retaining grease therein for providing lubrication between the kingpin and the steering knuckle during articulation of the steering knuckle.

15. The steering knuckle assembly of claim 14 further comprising a pair of end caps, each end cap cooperating with a corresponding yoke outer surface and having an opening therethrough for venting to atmosphere.

16. A steering assembly for use in a motor vehicle, comprising:

- a steer axle beam generally symmetrical about a centerline and having a pair of opposed distal ends, each distal end having a pin bore formed therethrough;
- a pair of steering knuckle assemblies, each steering knuckle assembly pivotally cooperating with a distal end of the steer axle beam and including a knuckle having an upper yoke and lower yoke, each yoke having an upper bore and lower bore, respectively, longitudinally formed therethrough which are coaxially aligned with each other and with the pin bore of the corresponding distal end of the steer axle beam, each of the upper yoke and lower yoke further including a yoke outer surface, and a yoke face surface for cooperating with the corresponding distal end of the steer axle beam;
- a pair of kingpins, each kingpin having opposed ends and received by the corresponding pin bore of the axle beam distal end and the upper bore and lower bore, the kingpin for fastening each steering knuckle assembly to a corresponding distal end of the steer axle beam;
- a pair of end caps corresponding to an adjacent one of the pair of steering knuckle assemblies, each end cap cooperating with a corresponding yoke outer surface and having an opening therethrough for venting to atmosphere; and
- a pair of bladder seals corresponding to an adjacent one of the pairs of steering knuckle assemblies, each of the pair of bladder seals disposed between an adjacent end cap and kingpin end for providing lubrication between the kingpin and knuckle when the knuckle is under load.

17. The steering assembly of claim 16 wherein the bladder seal and adjacent kingpin end define a grease receptacle for retaining grease therein for providing lubrication between the kingpin and knuckle when the knuckle is under load.

* * * * *